(12) United States Patent
Swihart, III

(10) Patent No.: US 9,163,680 B2
(45) Date of Patent: Oct. 20, 2015

(54) POWERLESS BRAKE

(71) Applicant: Foster-Miller, Inc., Waltham, MA (US)

(72) Inventor: Thomas C. Swihart, III, Pittsburgh, PA (US)

(73) Assignee: Foster-Miller, Inc., Waltham, MA (US)

( * ) Notice: Subject to any disclaimer, the term of this patent is extended or adjusted under 35 U.S.C. 154(b) by 72 days.

(21) Appl. No.: 13/621,936

(22) Filed: Sep. 18, 2012

(65) Prior Publication Data

US 2014/0076671 A1 Mar. 20, 2014

(51) Int. Cl.
*F16D 59/02* (2006.01)
*F16D 59/00* (2006.01)

(52) U.S. Cl.
CPC ............... *F16D 59/00* (2013.01); *F16D 59/02* (2013.01)

(58) Field of Classification Search
CPC .......... F16D 65/14; F16D 59/00; F16D 59/02
USPC .............. 188/129, 134, 171, 180, 181 T, 187, 188/158, 161, 166; 74/89.16; 192/56.54, 192/223.3
See application file for complete search history.

(56) References Cited

U.S. PATENT DOCUMENTS

| | | | | |
|---|---|---|---|---|
| 2,827,136 A | * | 3/1958 | Sorchy | 188/166 |
| 2,947,393 A | * | 8/1960 | Grover | 192/18 B |
| 3,203,523 A | * | 8/1965 | Gilder et al. | 192/56.57 |
| 3,572,482 A | * | 3/1971 | Kalpas et al. | 192/15 |
| 3,844,387 A | * | 10/1974 | Morokoshi | 188/187 |
| 4,176,733 A | * | 12/1979 | Twickler | 188/134 |
| 4,255,946 A | * | 3/1981 | Hansen | 464/36 |
| 4,548,305 A | * | 10/1985 | Anderson | 192/56.54 |
| 4,850,458 A | | 7/1989 | Allan et al. | |
| 5,199,538 A | * | 4/1993 | Fischer et al. | 192/223.3 |
| 5,485,904 A | * | 1/1996 | Organek et al. | 192/35 |
| 5,651,437 A | * | 7/1997 | Organek et al. | 192/35 |
| 6,125,975 A | | 10/2000 | Seeto et al. | |
| 7,735,612 B2 | | 6/2010 | Pozivilko et al. | |

OTHER PUBLICATIONS

Grainger, Dayton Brake, Motor, 6 Ft. Lb., webpage http://www.grainger.com/Grainger/DAYTON-Double-C-Face-M... printed May 31, 2012 (one (1) page).
Brook Crompton Brake Motors, 2010E, Frames 63 to 355 L, Issue 1, Invensys, Brook Crompton, West Yorkshire HD1 3LJ England, forty-three (43) pages total.
Written Opinion of the International Searching Authority for PCT Application No. PCT/US2013/060130 mailed Feb. 18, 2014 (six (6) pages).

* cited by examiner

*Primary Examiner* — Christopher Schwartz
(74) *Attorney, Agent, or Firm* — Iandiorio Teska & Coleman, LLP

(57) ABSTRACT

A motor brake includes an actuator fixed to a motor shaft and including spaced peripheral ears including a member therethrough. A fixed plate includes spaced detents and an output about the actuator has spaced ball releasably urged into the fixed plate detents by the actuator ear members. The output has channels for the actuator ears for driving the output with the actuator when the actuator ear members release the output spaced balls from the fixed plate detents.

24 Claims, 9 Drawing Sheets

POWERLESS BRAKE

FIELD OF THE INVENTION

The invention relates to brake motors and brakes for shafts.

BACKGROUND OF THE INVENTION

A typical AC or DC motor has a shaft or individual rotor driving a gear reducer, or sprocket, for example, or other structure.

Motor brakes are used to hold a load stationary, to brake a load, for soft stop braking, or the like. Many brakes employ a friction disk keyed to the motor shaft. The friction disk rotates between two plates one of which is fixed and the other of which is axially driven by spring pressure. Electromagnets are energized when the motor is on compressing the spring and releasing the pressure on the friction disk. When the motor is de-energized, the electromagnets are also de-energized and the spring driven plate presses the friction disk between the two plates.

These and other powered brakes for motor drives often require a large amount of space within the drive system as well as additional wiring and power.

SUMMARY OF THE INVENTION

A new and powerless brake design is featured which reduces the amount of space required for a motor brake and eliminates or reduces the electrical control signals required for brake disengagement. An actuator driven by the motor shaft is configured to free an output flange from engagement with a fixed plate when the motor shaft turns under an applied predetermined torque. The actuator locks the output flange into engagement with the fixed plate when the motor shaft stops turning and the predetermined torque is not applied.

A shaft brake is featured and includes a fixed plate, an output flange releasably lockable with respect to the fixed plate, and an actuator driven by the shaft and configured to free the output flange from engagement with the fixed plate when the shaft turns and to then drive the output flange. The actuator also positions the output flange into locked engagement with the fixed plate when the shaft stops turning.

In one example, the fixed plate includes spaced detents therein and the output flange includes spaced balls releasably received in the fixed plate spaced detents. This particular actuator includes spaced members urging an output flange bearing into a fixed plate detent when the shaft stops. One actuator includes spaced ears and the output flange includes spaced channels receiving the spaced ears of the actuator for driving the output flange with the actuator. The spaced channels may be configured to allow limited movement of the actuator spaced ears allowing limited rotation of the actuator with respect to the output flange. In one example, the actuator spaced members include a set screw extending through each or select actuator spaced ears.

One or more centering springs can be positioned to center each actuator ear in its respective output flange channel when the shaft stops. Typically, the actuator spaced members are positioned to urge an actuator ball into a fixed plate detent when the actuator ears are centered in their respective output flange channels. In another design, one or more magnets can be positioned to center each actuator ear in its respective output flange channel when the shaft stops.

In one aspect, a motor shaft brake comprises a fixed portion an output releasably lockable with respect to the fixed portion, and an actuator rotatable with respect to the fixed portion and configured to release from and drive the output with respect to the fixed portion when the actuator is driven. When the actuator stops, the actuator locks the output with respect to the fixed portion. The actuator may include spaced peripheral ears and the output may include spaced channels receiving the spaced ears of the actuator for driving the output.

Also featured is a shaft braking method comprising attaching a rotatable actuator to a driven shaft, positioning a fixed plate about the shaft, and attaching a flange to an output releasably lockable with respect to the fixed plate. The output is locked when the actuator stops and freed the output when the actuator rotates. Also, the output is driven when freed by the actuator.

One brake design includes an actuator with a stem fitted to a driven shaft and lobes extending radially outward from the stem, an output about and driven by the actuator and including channels for the lobes, and a fixed disk about the actuator and the output and releasably engaging the output when not driven by the actuator. Preferably, the output includes at least one ball releasably driven into a fixed disk detent by the actuator.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figures 1A, 1B:
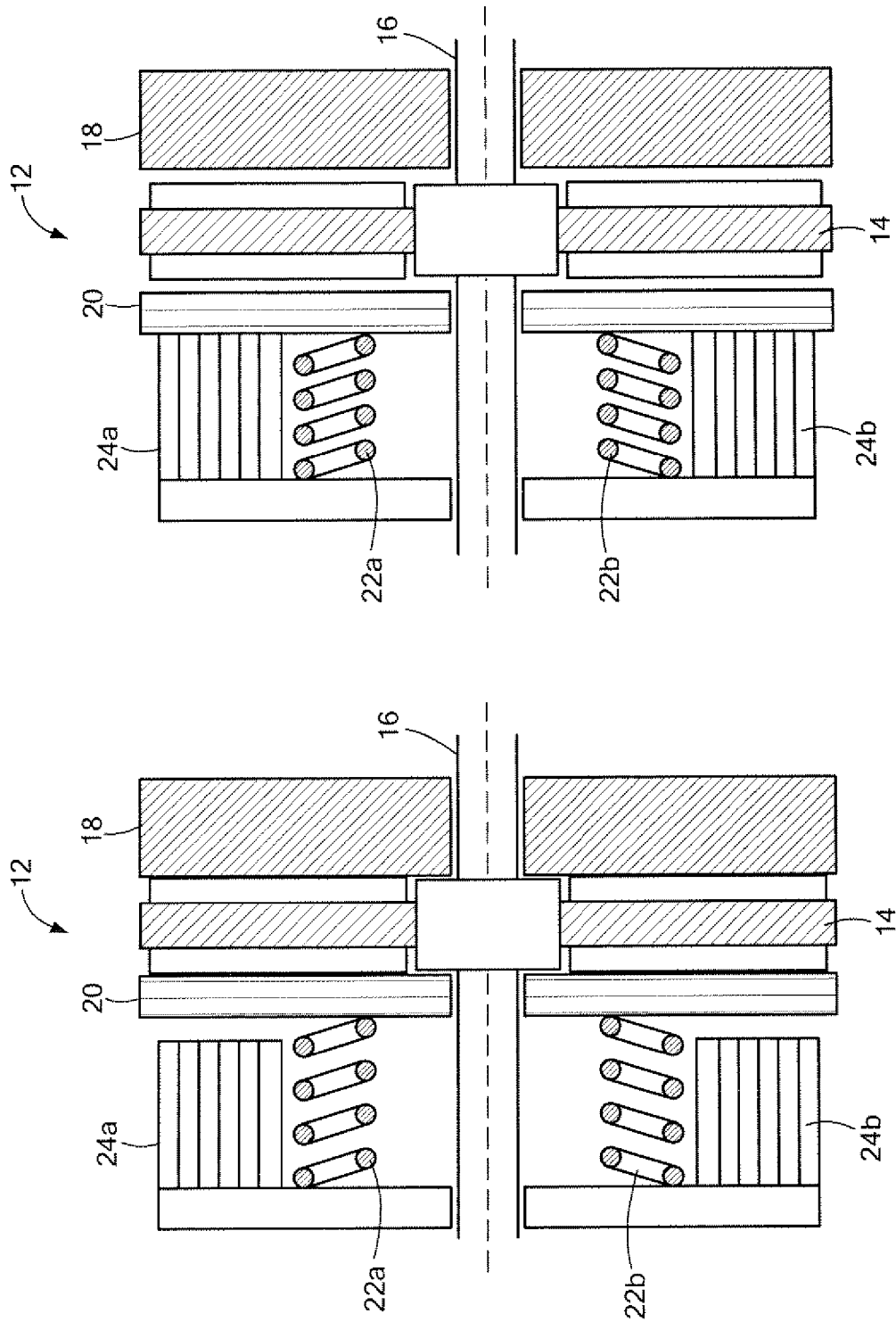
FIG. 1A is a schematic cross-sectional view showing a prior art motor brake in the configuration when to brake is de-energized.
FIG. 1B is a schematic cross-sectional view of the brake of FIG. 1A when the brake is energized.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Prior art motor shaft brake 12, FIGS. 1A and 1B include friction disk 14 keyed to motor shaft 16 between fixed plate 18 and axially driven plate 20. Springs 22a and 22b bias axially driven plate 20 against friction disk 14 for a braking action when electromagnets 24a and 24b are de-energized as shown in FIG. 1A. When electromagnets 24a and 24b are energized as shown in FIG. 1B, the spring force is overcome and there is now a gap between axially driven plate 20 and friction disk 14 as well as between friction disk 14 and stationary disk 18. Such powered brakes prevent back driving of the system but require a significant amount of space and also require electrical control signals in order to disengage the brake adding complexity.

Figure 2:
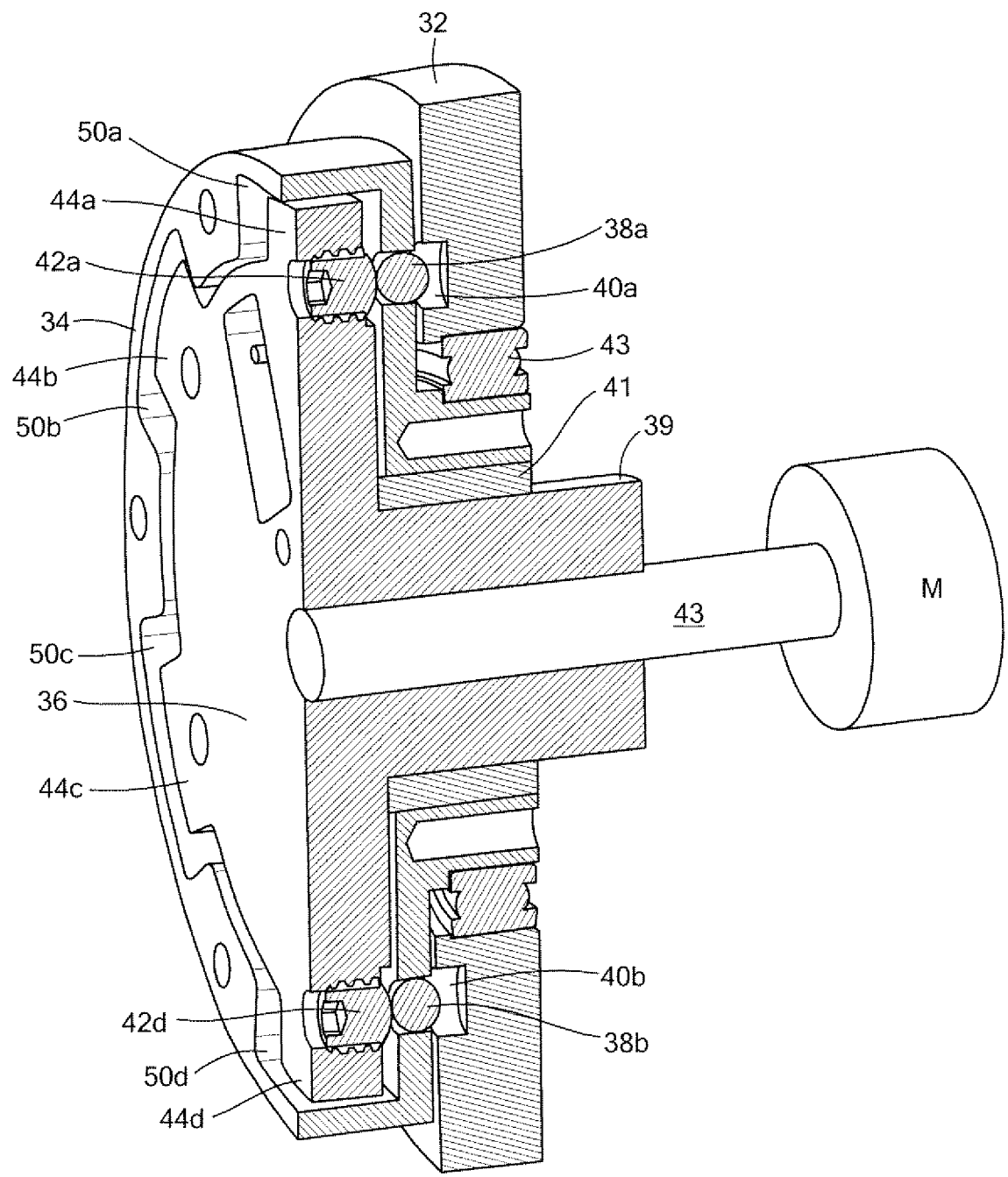
FIG. 2 is a schematic three dimensional cut away view showing an example of a powerless brake in accordance with the invention.
Figure 3:
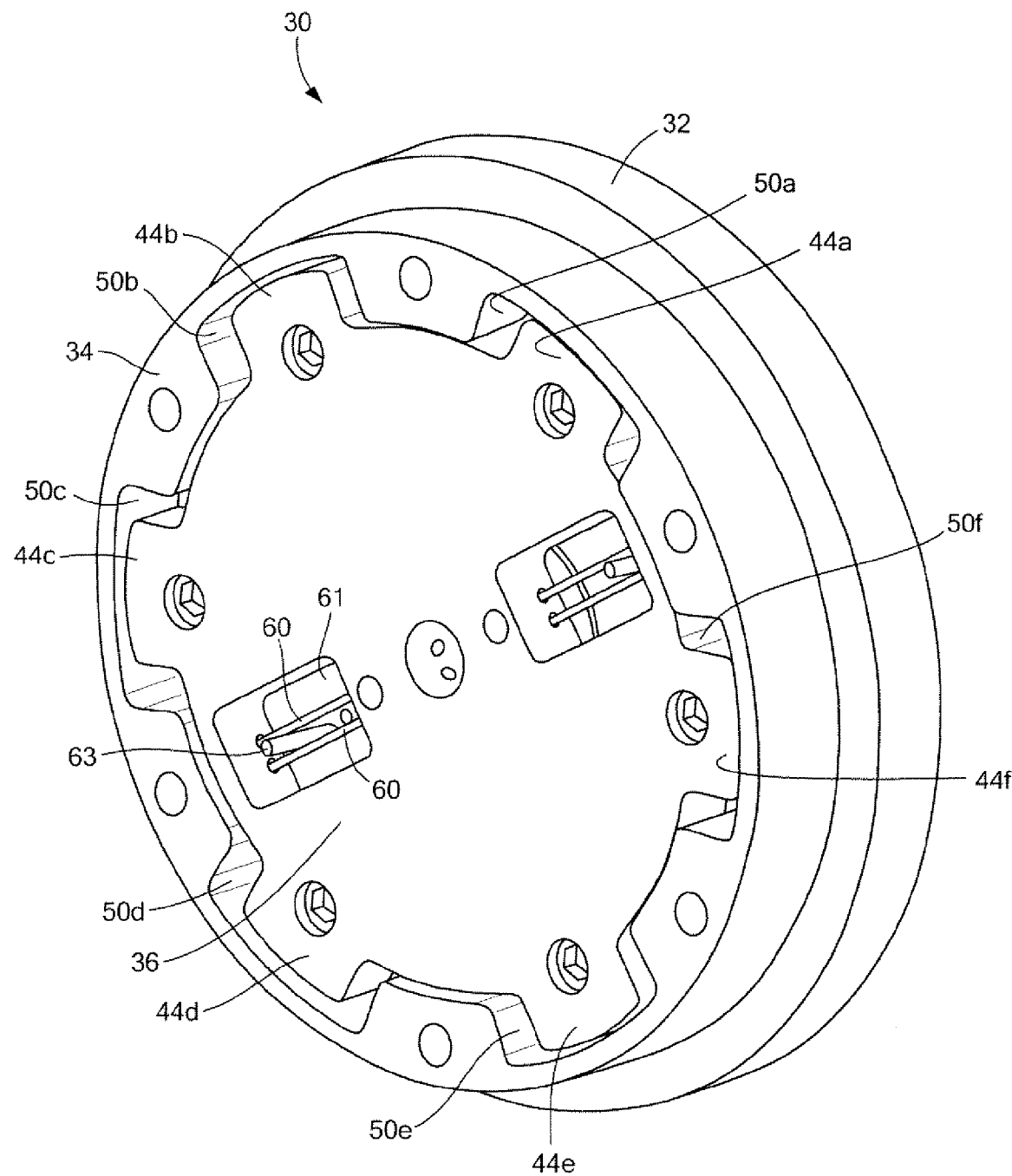
FIG. 3 is a schematic three dimensional front view of the brake shown in FIG. 2.
Figure 4:
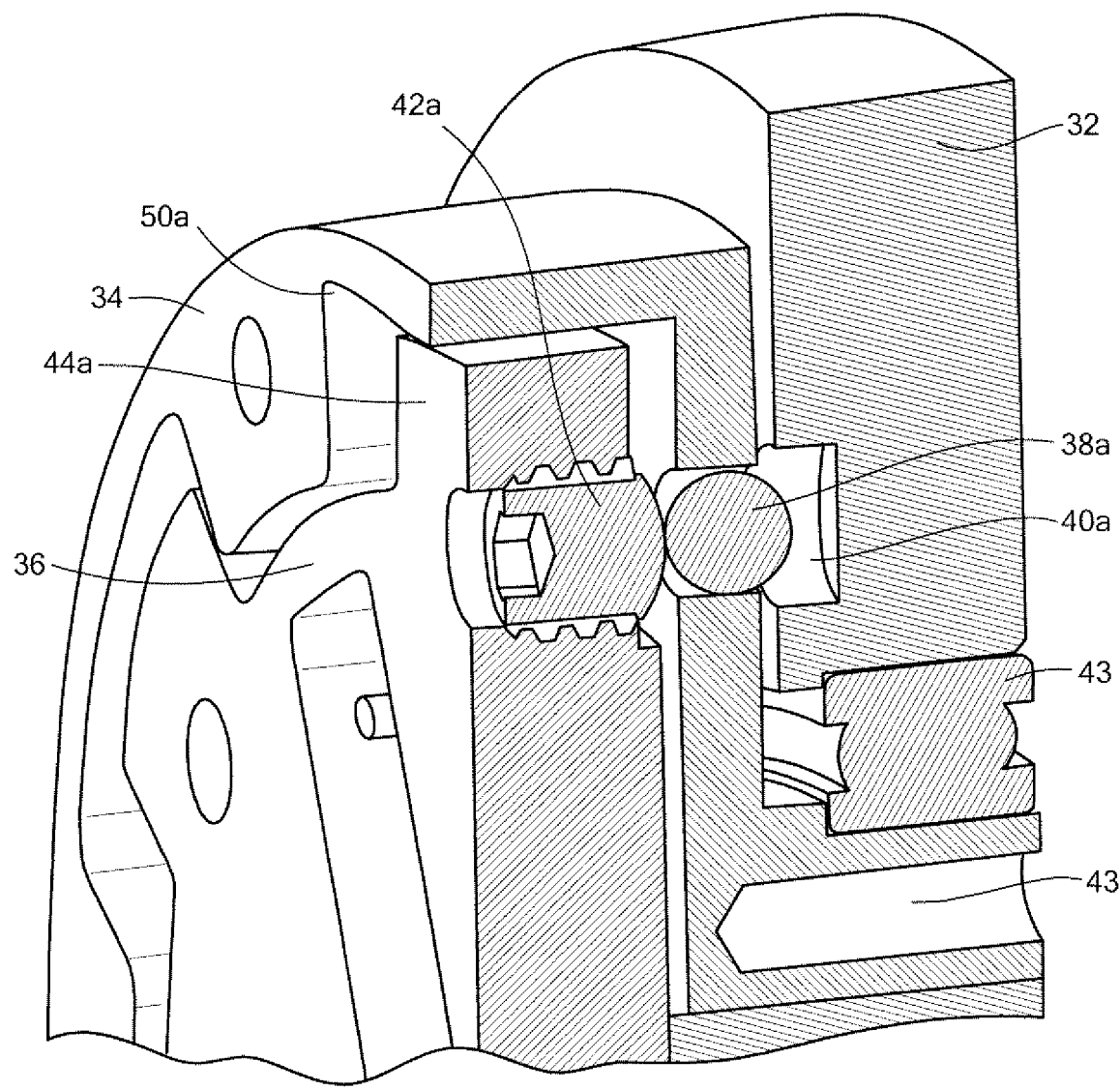
FIG. 4 is a close up depiction of a portion of the brake shown in FIGS. 2-3.

FIGS. 2 and 3 show an example of a new motor shaft brake 30 in accordance with the invention including fixed plate 32, output flange 34, and actuator 36. Actuator 36 is driven by the motor shaft typically keyed to stem 39 and within bore 43. Actuator 36 further includes radial lobes or ears 44a-44d. Output flange 34 is connected to another flange connected to another shaft or to some kind of other structure such as a gear or sprocket or pulley to be driven by the motor shaft. Output flange 34 rotates between ring bearing 41 about actuator stem 39 and ring bearing 43 disposed between output flange 34 and fixed plate 32.

Figure 5:
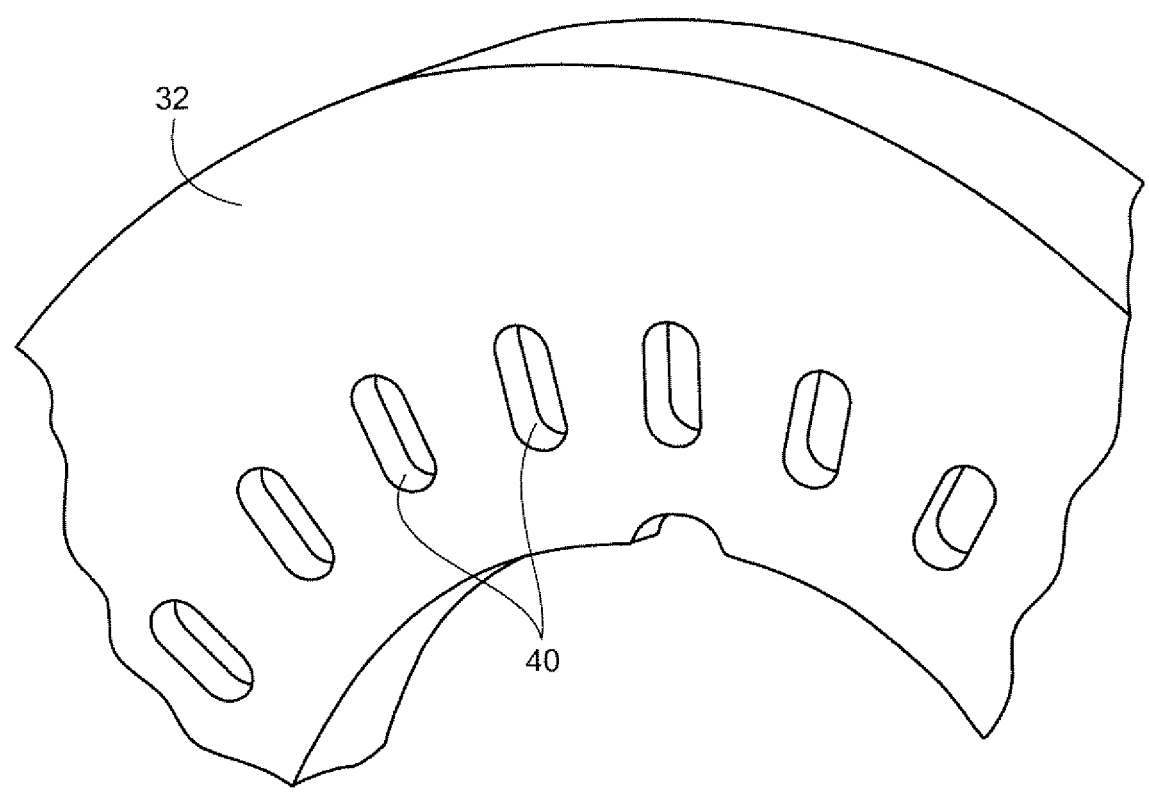
FIG. 5 is a schematic partial view of the fixed plate brake component shown in FIGS. 2-4.

Output flange 34 is releasably locked with respect to fixed plate 32 by virtue of a series of members such as the balls as shown at 38a and 38b which, in one configuration, are free of their corresponding detents or slots 40a, 40b in fixed plate 32. FIG. 5 shows a series of ball slots in fixed plate 40 and it is understood that there are a plurality (for example six) balls in output flange 34. In general, irrespective of the specific design, actuator 36 driven by the motor shaft is configured to drive the output flange 34 free from engagement with fixed plate 32 when the motor shaft and the actuator rotates under an applied predetermined torque. Actuator 36 is further configured to position the output flange 34 into locked engagement with fixed plate 32 when the motor shaft stops and the predetermined torque is not applied. In this specific example, the spaced balls 38a, 38b, and the like of output flange 34 are releasably received in the spaced slots 40 of fixed plate 32.

So, actuator 36 in this design includes spaced members such as crowned set screws 42a, 42d (typically one per actuator lobe or ear 44a-44d) each positioned and configured to urge its respective output flange bearing 38 into a fixed plate slot 40 when the motor shaft stops and no torque is applied to actuator 36. In this configuration, the lobes or ears 44 are centered with respect to the corresponding channels 50a-50f formed in output flange 34. When the motor is de-energized and the shaft stops spinning, the ears 44 of actuator 36 are biased into a centered position with respect to the channels 50 of output flange 34 by centering springs as shown at 60, by magnetic attraction, or the like. As shown in FIGS. 2 and 3, spring 60 are flexible pins spanning slot 61 in actuator 36. Dowel pin 63 is fixed to output flange 34 and is disposed between the spring members 60.

Thus, when the motor shaft stops spinning, the output flange is locked with respect to the fixed plate by virtue of the actuator set screws forcing via spring force, the output flange balls into the slots of the fixed plate locking the output flange with respect to the fixed plate and braking the motor and thus braking any load driven by the motor.

When, however, the motor shaft turns, actuator 36 and its lobes or ears 44 turn in their respective output flange channels 50 and no longer are the crowned set screws of actuator 36 pressing the balls 38 of the output flange 34 into the slots of fixed plate 32. Each ball of output flange 34 is then freed from its slot in fixed plate 32 and now the output flange 34 spins with actuator 36 (which is driven by the motor shaft) as lobes or ears 44 of actuator 36 reach the end of their travel in their respective channels 50 in output flange 34. Thus, each output flange 34 spaced peripheral channel 50 is configured to allow limited movement of an actuator 36 spaced ear 44 resulting in limited rotation of actuator 36 with respect to output flange 34 and driving of output flange 34 by actuator 36. The limited rotation of the actuator releases the balls of the output flange from the slots of the fixed plate.

Figure 6:
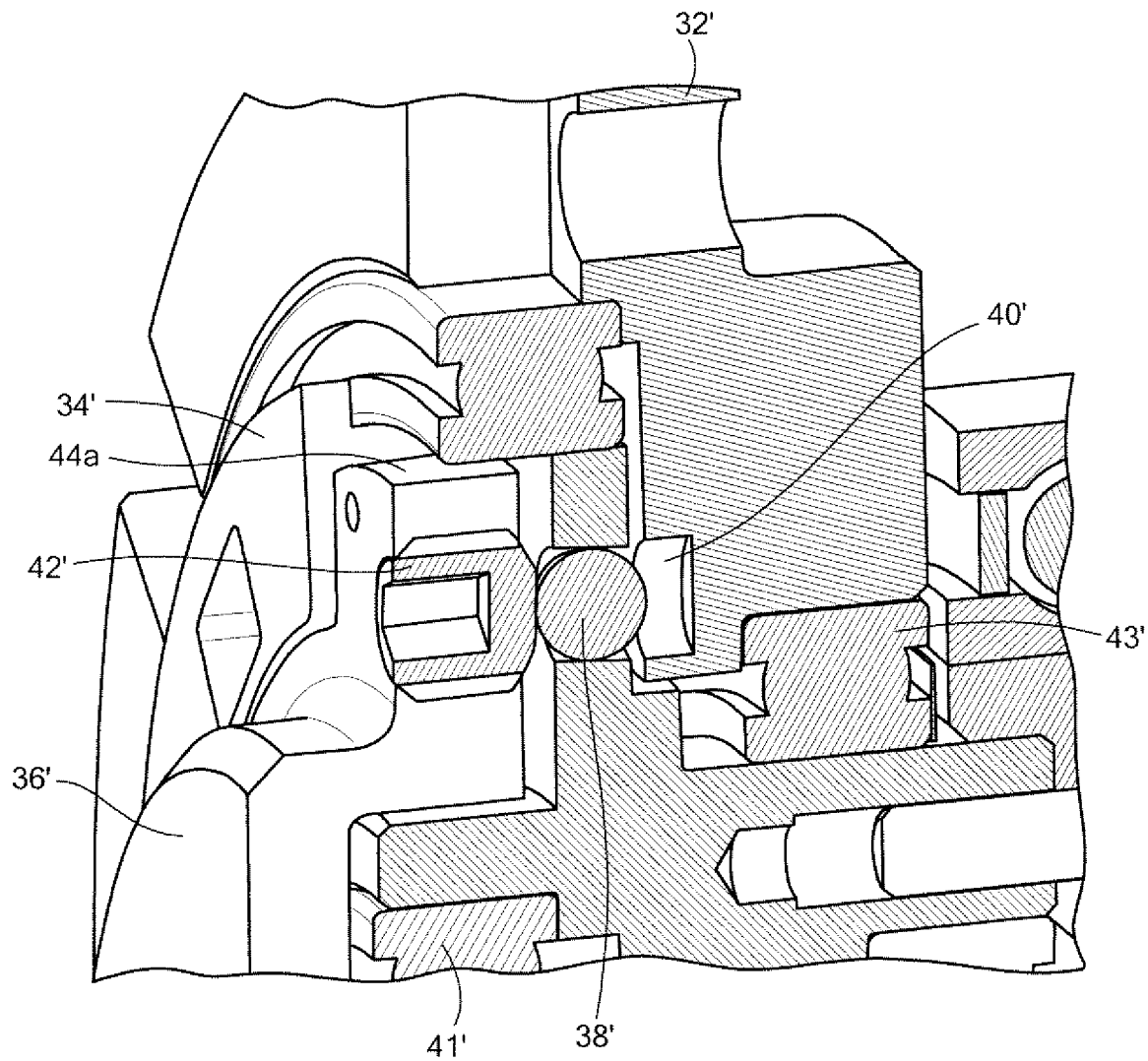
FIG. 6 is a schematic cross-sectional view of another version of a motor brake in accordance with an example of the invention.

FIG. 6 shows a version where centering of the lobes 44' of actuator 36' within the channels of output flange 34' is accomplished magnetically. Set screws 42' or equivalent members of actuator 36' drive balls 38' of output flange 34' into slots 40' of fixed plate 32' when the motor shaft keyed to actuator 36' stops spinning.

Figure 7:
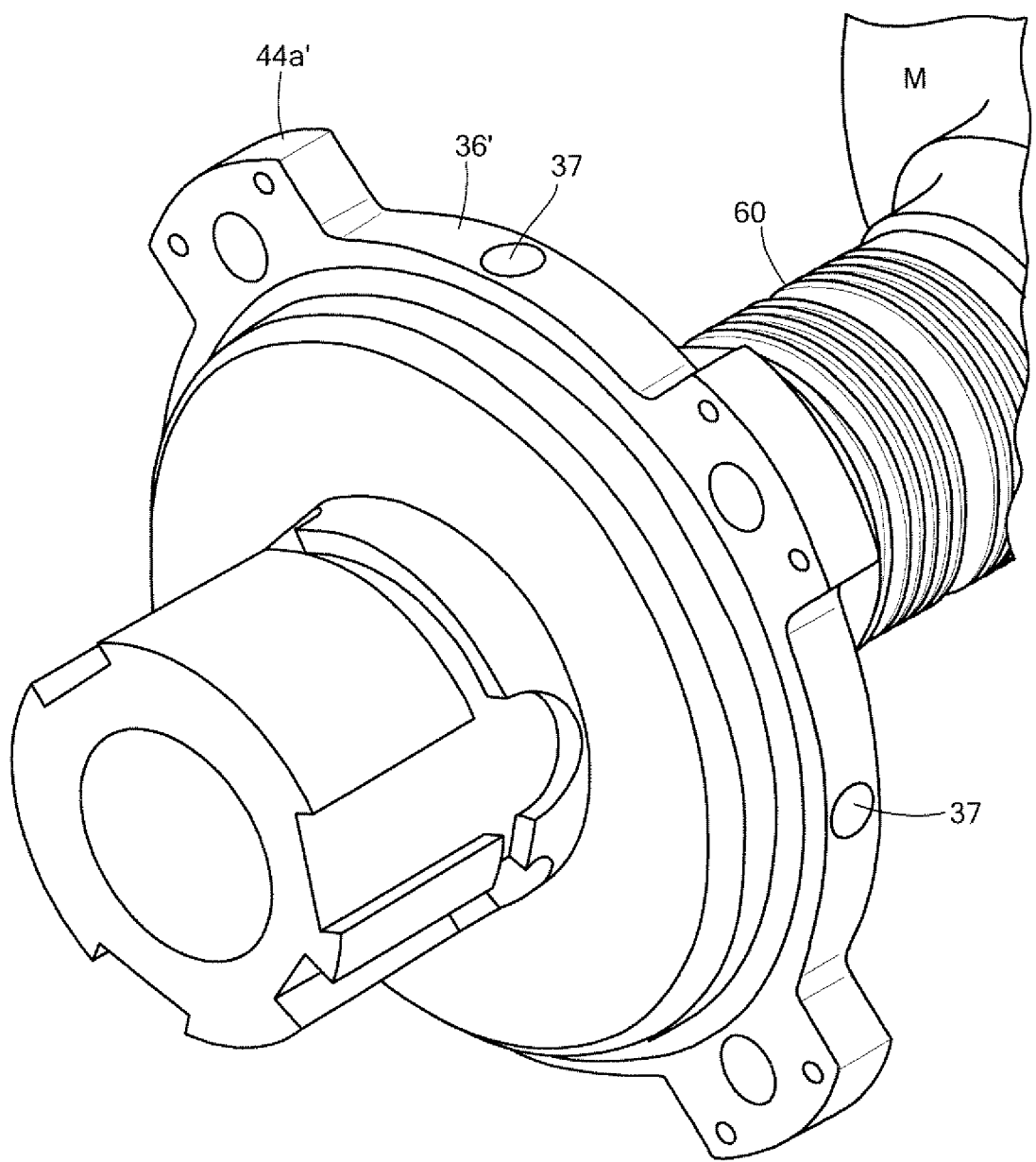
FIG. 7 is a schematic three dimensional view of the actuator component of the brake of FIG. 6.
Figure 8:
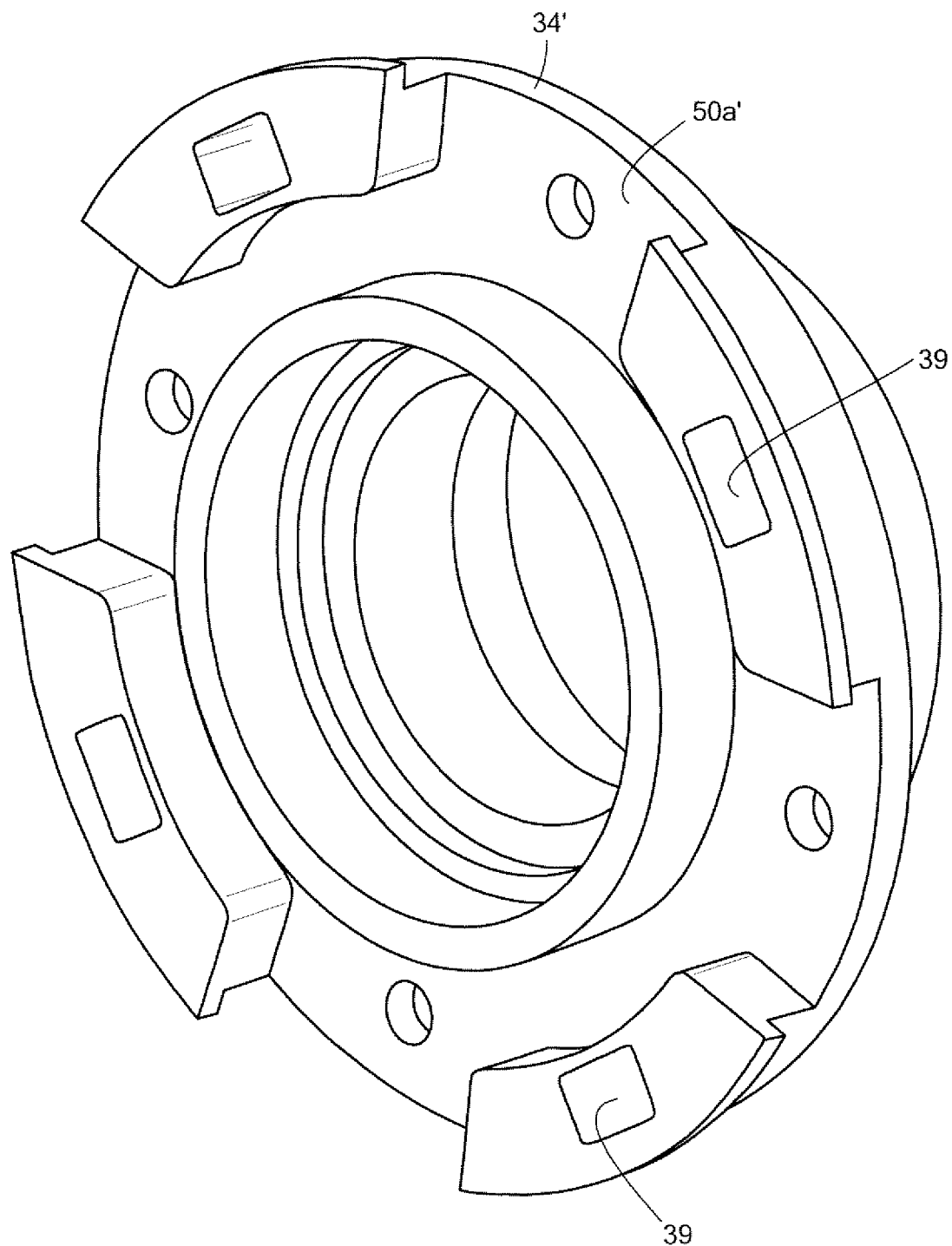
FIG. 8 is a schematic three dimensional view of the output component of the brake of FIG. 6.
Figure 9:
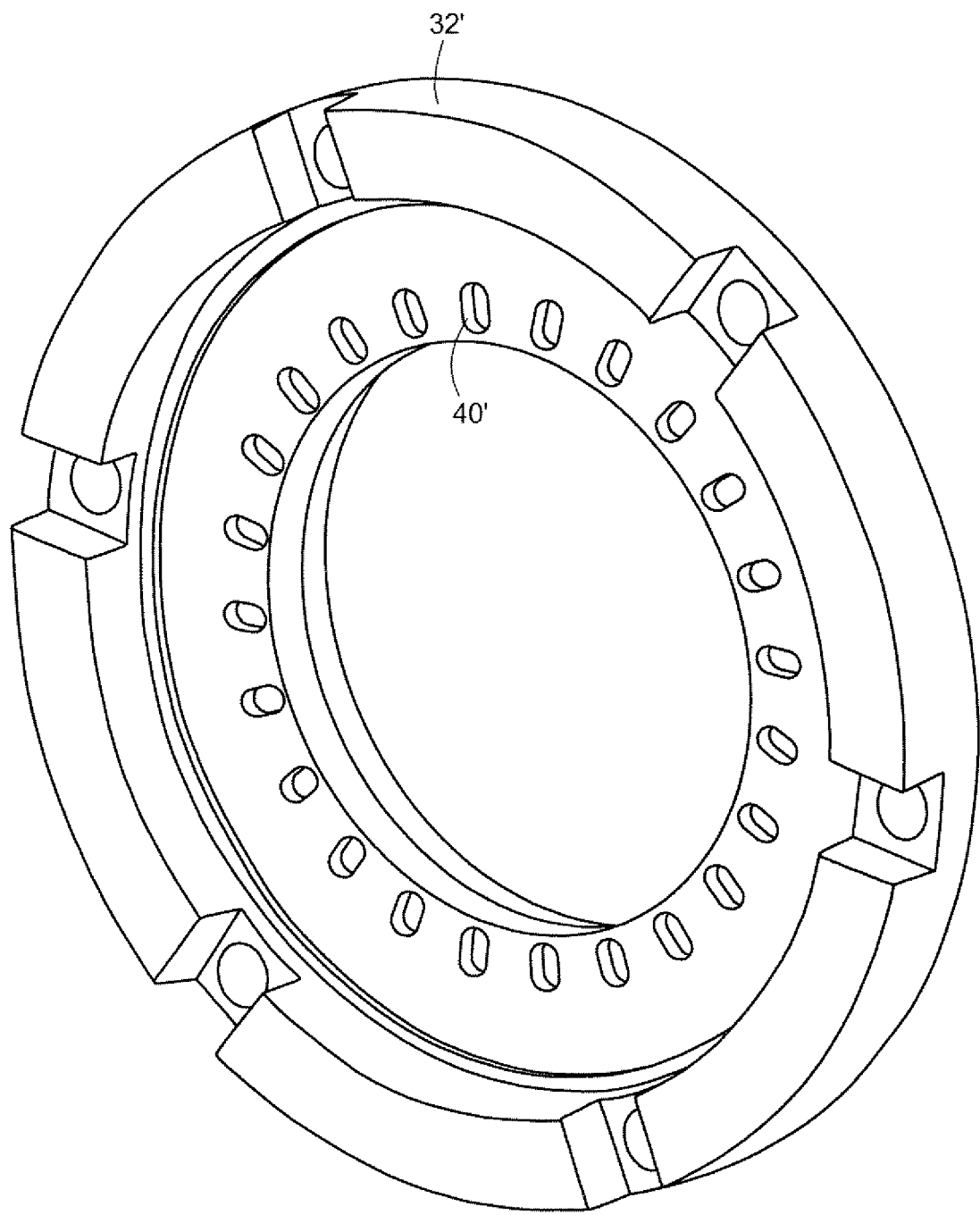
FIG. 9 is a schematic three dimensional view of the fixed component of the brake of FIG. 6.

FIG. 7 shows actuator 36' on motor shaft 60. The set screws are threaded into the bores shown in the lobes 44'. FIG. 8 shows output flange 34'. The balls are set in the bores in channels 50'. FIG. 9 shows fixed plate 32' with detents 40'. Pockets 37, FIG. 7, in the periphery of actuator 36', receives set screws or other ferrous metal members attached to magnets set in pockets 39, FIG. 8 of output flange 34'. The magnets are oriented so the magnetic field is radial.

The result, in various embodiments, is a powerless brake which can be configured for space savings and to eliminate electrical control signals required for power brake disengagement. Although specific features of the invention are shown in some drawings and not in others, however, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:
1. A shaft brake comprising:
a fixed plate;
an output flange releasably lockable with respect to the fixed plate and configured to be coupled to a structure to be driven by the shaft; and
an actuator driven by the shaft and configured to free the output flange from engagement with the fixed plate when the shaft turns, to then drive the output flange in rotation, and to position the output flange into locked engagement with the fixed plate when the shaft stops.
2. The brake of claim 1 in which the fixed plate includes spaced detents therein.

3. The brake of claim 2 in which the output flange includes spaced balls releasably received in said fixed plate spaced detents.

4. The brake of claim 3 in which the actuator includes spaced members urging an output flange ball into a fixed plate detent when the shaft stops.

5. The brake of claim 4 in which the actuator includes spaced ears and the output flange includes spaced channels receiving the spaced ears of the actuator for driving the output flange with the actuator.

6. The brake of claim 5 in which the output flange spaced channels are configured to allow limited movement of the actuator spaced ears allowing limited rotation of the actuator with respect to the output flange.

7. The brake of claim 6 further including one or more centering springs positioned to center each actuator ear in its respective output flange channel when the shaft stops.

8. The brake of claim 7 in which the actuator spaced members are positioned to urge an actuator ball into a fixed plate detent when the actuator ears are centered in their respective output flange channels.

9. The brake of claim 5 in which the actuator spaced members include a set screw extending through each or select actuator spaced ears.

10. A motor shaft brake comprising:
a fixed portion;
an output releasably lockable with respect to the fixed portion and configured to be coupled to a structure to be driven by the shaft; and
an actuator rotatable with respect to the fixed portion and configured to release from and drive the output in rotation with respect to the fixed portion when the actuator is driven and, when the actuator stops, to lock the output with respect to the fixed portion.

11. The brake of claim 10 in which the actuator includes spaced peripheral ears and the output includes spaced channels receiving the spaced ears of the actuator for driving the output.

12. The brake of claim 11 in which the actuator spaced ears include a member extending therethrough.

13. The brake of claim 12 in which the output includes balls corresponding to the ear members.

14. The brake of claim 13 in which the fixed portion includes detents for the output balls.

15. The brake of claim 11 in which the output spaced channels are configured to allow limited movement of the actuator spaced ears allowing limited rotation of the actuator with respect to the output.

16. The brake of claim 10 further including means for centering the actuator with respect to the output when the actuator stops.

17. A shaft brake comprising:
a fixed plate including spaced detants therein;
an output flange releasably lockable with respect to the fixed plate and including spaced balls releasably received in the fixed plate spaced detants; and
an actuator driven by the shaft and configured to free the output flange from engagement with the fixed plate when the shaft turns, to then drive the output flange in rotation, and to position the output flange into locked engagement with the fixed plate when the shaft stops.

18. The brake of claim 17 in which the actuator includes spaced members urging an output flange ball into a fixed plate detent when the shaft stops.

19. The brake of claim 18 in which the actuator includes spaced ears and the output flange includes spaced channels receiving the spaced ears of the actuator for driving the output flange with the actuator.

20. A brake comprising:
an actuator with a stem fitted to a driven shaft and lobes extending radially outward from the stem;
an output about and driven by the actuator and including channels for the lobes; and
a fixed disk about the actuator and the output and releasably engaging the output when not driven by the actuator.

21. The brake of claim 20 in which the output includes at least one ball releasably driven into a fixed disk detent by the actuator.

22. A motor shaft brake comprising:
a fixed portion;
an output releasably lockable with respect to the fixed portion and including spaced channels; and
an actuator with spaced peripheral ears received in the spaced channels of the output and rotatable with respect to the fixed portion and configured to release from and drive the output with respect to the fixed portion when the actuator is driven and, when the actuator stops, to lock the output with respect to the fixed portion.

23. The brake of claim 22 in which the actuator spaced ears include a member, the output includes balls corresponding to the ear members, and the fixed portion includes detents for the output balls.

24. A brake comprising:
an actuator fixed to a motor shaft and including spaced peripheral ears each including a member;
a fixed plate including spaced detents; and
an output about the actuator and including:
spaced balls releasably urged into the fixed plate detents by the actuator ear members, and
channels for the actuator ears for driving the output with the actuator when the actuator ear members release the output spaced balls from the fixed plate detents.

* * * * *